United States Patent [19]

Meier

[11] 4,336,294
[45] Jun. 22, 1982

[54] COATED BOARDS OF WOODEN MATERIAL IN PARTICULAR FOR USE IN FURNITURE

[76] Inventor: Max Meier, Stecket-Strasse 16, D-7585 Lichtenau-Scherzheim, Fed. Rep. of Germany

[21] Appl. No.: 119,419

[22] Filed: Feb. 7, 1980

[51] Int. Cl.³ .............................................. B32B 21/08
[52] U.S. Cl. ...................................... 428/192; 156/41; 156/45; 156/257; 156/268; 428/511; 428/535
[58] Field of Search ...................... 428/192, 535, 511; 156/41, 45, 268, 257

[56] References Cited

U.S. PATENT DOCUMENTS

| | | | |
|---|---|---|---|
| 650,440 | 5/1900 | Ward | 428/192 |
| 3,668,053 | 6/1972 | Ayres | 428/192 X |
| 3,849,235 | 11/1974 | Gwynne | 428/192 |
| 4,183,987 | 1/1980 | Ely et al. | 428/192 |

FOREIGN PATENT DOCUMENTS

| | | |
|---|---|---|
| 7205427 | 5/1972 | Fed. Rep. of Germany . |
| 2127227 | 12/1972 | Fed. Rep. of Germany . |
| 2246913 | 4/1974 | Fed. Rep. of Germany . |
| 2447873 | 4/1976 | Fed. Rep. of Germany . |
| 7617404 | 5/1976 | Fed. Rep. of Germany . |
| 7624914 | 11/1976 | Fed. Rep. of Germany . |

*Primary Examiner*—Thomas J. Herbert, Jr.
*Attorney, Agent, or Firm*—Sandler & Greenblum

[57] ABSTRACT

A wooden board for use for example as a table top has a moisture-proof coating on its upper surface and an edging of synthetic material which is sprayed under pressure on to the cut edge surface of the board. The edging overlaps the adjacent edge of the upper surface of the board and penetrates a profiled cut-out in the edge surface. In order to give a good moisture seal, the cut-out profile has an inwards directed back cut immediately under the upper board surface and a lower outwardly directed projection.

6 Claims, 13 Drawing Figures

COATED BOARDS OF WOODEN MATERIAL IN PARTICULAR FOR USE IN FURNITURE

This invention relates to a board of wooden material, for use for example as a furniture board such as a table top, in particular for a garden, camping, kitchen table or the like, said board having a moisture-proof coating at least on the upper side thereof and an edging of synthetic material sprayed under pressure onto a cut edge surface of the board, which edging overlaps by means of a strip at least the upper edge between the cut surface and the upper side, the cut surface having a profile thereto and the sprayed edging filling said profile.

In coated boards of wooden material having an edging of synthetic material, such edging primarily forms an edge protection and a covering for open-pored cut edge surfaces. In the case of furniture boards, used as table tops for garden, camping or kitchen tables, in which the penetration of liquids and moisture must always be expected, the synthetic edging must fulfill a further very important task. That is, like the moisture-proof coating of the upper side, the synthetic edging is intended to prevent the penetration of moisture to the cut surfaces and consequent swelling of the board.

Conventional edging, so called edging strip, is produced from an extruded endless material which is cut to length and stuck at its ends. These edging strips, which have a certain elasticity, are fitted on the board. In many cases, adhesive is previously applied to the cut surfaces, in order to obtain a sealed connection. These edging strips are unsatisfactory, since they are unable to prevent the penetration of water and moisture at least in a permanent manner. In the case of boards of better quality, there has been an attempt to obviate this drawback due to the provision of a greater proportion of water-repellent bonding agent, e.g. epoxy resin or the like which is added to the wooden material. However, this makes a board of this type unreasonably expensive.

Recently, attempts have been made to remove this drawback by applying a synthetic edging directly to the cut surface. This can be carried out for example by inserting the board in a casting mould, in which case a gap is left between the shaped mould wall and the cut surfaces, in which gap the synthetic material is either introduced by foaming (German Offenlegungsschrift 2 447 873) or the synthetic material is introduced in a liquid form and is hardened (German Offenlegungsschrift 2 246 913, German Gebrauchsmuster 7 205 427). In this case, one makes use of the fact that the synthetic material penetrates the open pores of the cut surface at least partly and seals the latter. Apart from the fact that foamed synthetic edgings do not have the necessary resistance to impact, neither in the case of the foamed edgings nor in the case of synthetic materials hardened from the liquid state, is the effect sought after achieved to the desired extent, and, in particular, the edging becomes detached after it has been in use for some time.

Better results have been achieved with edgings which are sprayed on under pressure (German GM 7 617 404, German GM 7 624 914, German OS 2 127 227), since on account of the high spraying pressure, deeper penetration of the synthetic material into the pores is ensured, so that changes in shape which occur over a period of time, due to creeping and shrinking processes, lead to the edging being detached to a much lesser extent. This is further assisted by a profile provided on the cut surfaces, which leads to interlocking between the cut surfaces and the synthetic edging (German OS 2 127 227).

However, in this case, the seal at the edges is critical, in particular on the upper edge, where the liquid can penetrate primarily. A tight seal of the upper side of the board with the upper edge of the edging (German OS 2 127 227, German GM 7 617 404) is desirable in particular for reasons of the conditions of use, but necessarily leads to a gap, even though small, which is constantly enlarged due to the penetration of dirt and through which water is finally able to penetrate, thus reaching the cut surfaces. Also, an edging of this type is not durable. Therefore, edgings are to be preferred (German OS 2 127 227, German GM 7 624 914), in which at least a strip overlapping the upper edge of the board is provided, which thus lies on the moisture-proof upper side of the board, so that at least direct penetration of water and dirt to the cut surfaces is not possible. Nevertheless, it is not possible to completely prevent moisture from penetrating between the strip and board to the cut surface, over a period of time.

An object of the present invention is to construct a board (for example of the kind of German OS 2 127 227) with which the penetration of moisture and liquids to the cut surfaces can be substantially prevented.

According to the invention therefore there is provided a board made from wooden material, for use for example, as a furniture board such as a table top, in particular for garden, camping, kitchen tables or the like, said board having a moisture-proof coating at least on the upper side thereof and an edging of synthetic material sprayed under pressure on to a cut edge surface of the board, which edging overlaps by means of a strip at least the upper edge between the cut surface and the upper side, the cut surface having a profile thereto and the sprayed edging filling said profile, characterised in that, directly adjoining the said upper edge, the cut surface is set back into the board, thus forming a back cut, and said cut surface then projects outwards of the board.

Due to the back cut and subsequent projection, an accumulation of material can be obtained in the region of the cut surface, which accumulation, at the time of hardening of the synthetic material, can shrink more considerably than the remaining region of the edging. In so far as the edging extends around the entire board, this can produce a considerable tensile force in the direction of the cut surface, resulting from the shrinkage forces. The edging can thus obtain considerable pretension, so that even after it has been in use for a long time, the synthetic edging may not become detached from the cut surface due to shrinkage and creeping processes. At the same time due to the shrinkage forces, a tensile force can be produced which is directed downwards from the upper edge, which presses the strip firmly against the upper side of the board. Practical tests have shown that with this construction, it is not absolutely precluded that moisture or liquid can penetrate between the strip and the upper side of the board, but the seal directly in the region of a pointed region of the edge is so good that the liquid cannot penetrate any further to the cut surface. This surprising effect can also be put to use on the lower edge of the board by a similar construction, even if the danger of the penetration of liquids at this point is less.

In the case of edging strips which are cast without pressure (German GM 7 205 427), it is known for the cut surface to be set back slightly towards the inside, directly adjoining the upper and lower sides of the board, but this edging strip is flush with the upper side and lower side so that the effect which can be achieved by the edging according to the present invention cannot occur, especially since with the special construction of this known edging strip, the accumulation of material in the region outside the back cuts is just as great or even greater, so that the shrinkage process produces forces which are directed away from the back cut.

A preferred embodiment of the invention provides that adjoining the back cut, the cut surface tapers off towards the lower edge, thus forming an acute angle at the lower edge, so that the aforementioned effect occurs at this point also.

Alternatively, adjoining the back cut, the cut surface may also comprise at least one groove, which serves for the additional interlocking of the synthetic edging and cut surface.

In this case also it is advantageous if the surface of the groove adjacent the upper side of the board is likewise set back towards the inside, thus forming a back cut, in order to increase the shrinkage force directed inwards from the edges.

The invention will now be described further by way of example only and with reference to the accompanying drawings in which:

FIGS. 2a–2m are sections on the line II—II of different constructions of such table top.

Figure 1:
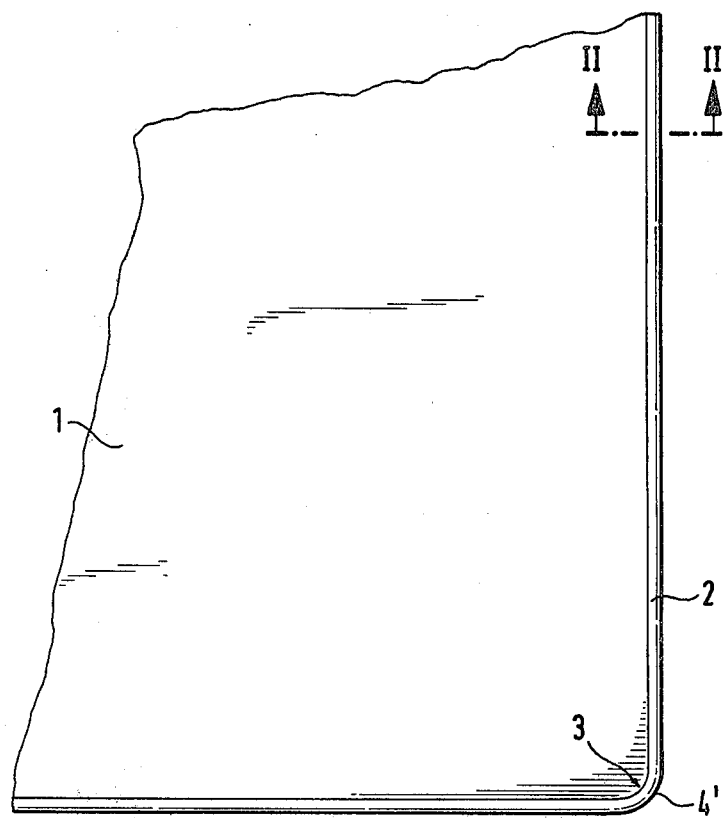
FIG. 1 is a plan view of part of a table top.

The table top 1 is provided with a peripheral edging 2 consisting of a sprayable synthetic material. The top has highly rounded edges at the corners 3 and the edging 2 is provided with correspondingly rounded parts 4'. The edging 2 is applied to the lateral cut surfaces of the table top 1, which consists of wooden material, for example pressed board, by spraying under pressure. FIGS. 2a–2m illustrate cross-sections in the region of the lateral cut surface of the table top 1 for different embodiments thereof.

In all the embodiments, the table top consists of a core board 4 of wooden material, which is provided with a moisture-proof coating 7 at least on its upper side 5, and in the embodiment illustrated also on its lower side 6. This coating may consist for example of paper soaked in melamine resin. In place of the latter, a weatherproof and impact proof synthetic lacquer coating or the like may, of course, be provided. Along its end faces, the core board 4 has cut surfaces 8, where the wooden material is exposed or open pores are present. These cut surfaces 8 are covered by the edging 2 of synthetic material.

Directly adjacent at least the upper side 5, the cut surface has a tapered back cut 9 which is set back towards the inside, with the result that an accumulation of material 10 forms directly below the upper edge, which accumulation leads to the aforedescribed shrinking and pre-tensioning effect. Due to this back cut, the upper edge 11 of the board tapers to a point.

Figure 2A:
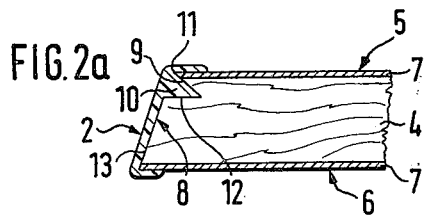
Figure 2B:
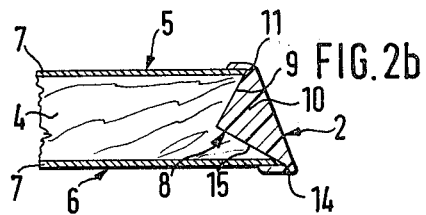
Figure 2C:
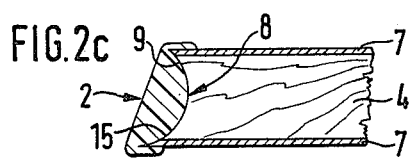

In the embodiment according to FIG. 2a, adjoining the back cut 9, the cut surface extends with a horizontal surface 12 towards the outside and then passes into the cut surface 13 extending obliquely outwards to the lower side 6. However, in the embodiment according to FIG. 2b, directly adjoining the lower edge 14, the cut surface 15 is likewise set back towards the inside, so that an approximately V-shaped profile is produced. A similar embodiment is shown in FIG. 2c. but in this case the back cuts 9, 15 are not rectilinear, but are constructed in the form of a curved surface. A similar construction is shown in FIGS. 2e and 2l.

Figure 2D:
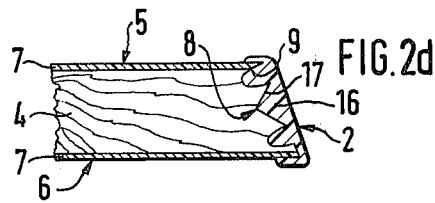
Figure 2E:
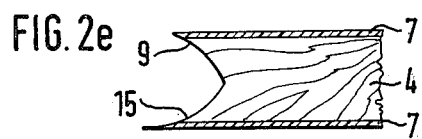

In the embodiment according to FIG. 2d. adjoining the back cut 9, a groove 16 is provided, the wall 17 of which adjacent the upper side 5 is once more set back towards the inside. The groove 16 thus has approximately V-shaped cross-section, whereas grooves with a curved wall adjoin this groove above and below.

Figure 2F:
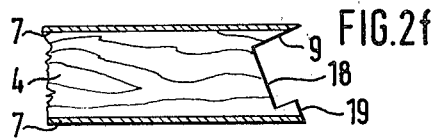

In the embodiment according to FIG. 2f. adjoining the back cut 9, the cut surface comprises a region 18 which is bevelled towards the outside and a projection 19 adjoining the latter towards the lower edge.

Figure 2G:
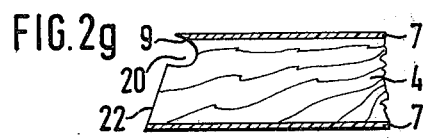
Figure 2H:
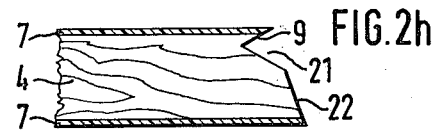

In the embodiments according to FIGS. 2g and 2h, the back cut 9 respectively forms part of the wall of a groove 20, 21, whereas the remaining part 22 of the cut surface is once more bevelled outwards in a rectilinear manner.

Figure 2I:
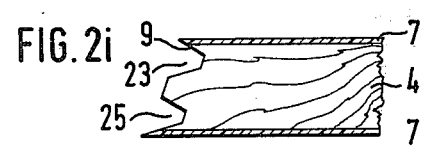
Figure 2K:
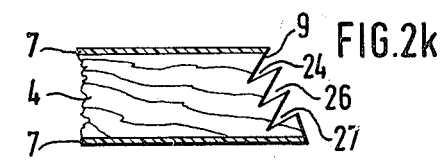
Figure 2L:
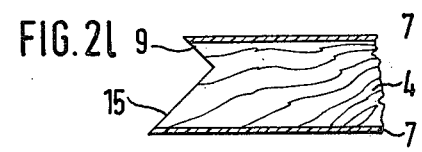
Figure 2M:
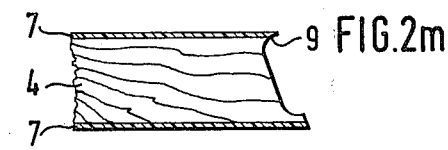

In the embodiments according to FIGS. 2i and 2k. which once more comprise a groove 23, 24 directly adjoining the back cut 9, one or two further grooves 25, 26 and 27 are provided, which once more have walls with a back cut. Finally, FIG. 2m illustrates an embodiment similar to FIG. 2f, but the back cut 9 is rounded off.

I claim:

1. A board made of wooden material for use, for example, as a furniture board, such as a table top, said board comprising an upper side and a moisture-proof coating on said upper side, said board further comprising a cut edge surface covered with an edging of synthetic material sprayed under pressure onto said cut edge surface so as to form a strip overlapping an upper edge between said upper side and said cut edge surface, said cut edge surface being cut away directly adjacent to said upper side to form said upper edge, said cut edge surface extending into the interior of said board to form a back cut and further extending outwardly from the interior of said board, said synthetic material filling said cut edge surface, and wherein said synthetic material is a material adapted to shrink after application in said cut edge surface to increase the resistance of said edging to moisture penetration.

2. The board as defined by claim 1 wherein said cut edge surface further comprises at least one groove adjoining said back cut.

3. The board as defined by claim 1 wherein said edging extends onto the upper side of said board.

4. The board as defined by claim 1 wherein said cut edge surface tapers directly from said back cut to a lower side of said board to form an acute angle therewith.

5. The board as defined by claim 4 wherein said cut edge surface has a V-shaped cross-section.

6. The board as defined by claim 4 wherein said cut edge surface is curved.

* * * * *